United States Patent
Zaitsu et al.

(10) Patent No.: US 7,797,100 B2
(45) Date of Patent: Sep. 14, 2010

(54) NAVIGATION SYSTEMS, METHODS, AND PROGRAMS

(75) Inventors: Tomoyuki Zaitsu, Okazaki (JP); Hiroki Ishikawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 637 days.

(21) Appl. No.: 11/231,864

(22) Filed: Sep. 22, 2005

(65) Prior Publication Data

US 2006/0074551 A1  Apr. 6, 2006

(30) Foreign Application Priority Data

Sep. 24, 2004 (JP) ............................. 2004-277313
Sep. 24, 2004 (JP) ............................. 2004-277655

(51) Int. Cl.
*G08G 1/00* (2006.01)
*G06G 7/76* (2006.01)
*G06F 19/00* (2006.01)

(52) U.S. Cl. ........................ 701/117; 701/1; 701/118; 701/119; 701/120; 701/200; 701/209; 340/995.1; 340/995.13

(58) Field of Classification Search .................. 701/1, 701/117–120, 200, 209; 340/995.1, 995.13
See application file for complete search history.

(56) References Cited

U.S. PATENT DOCUMENTS

| | | | |
|---|---|---|---|
| 6,882,930 B2 * | 4/2005 | Trayford et al. ............. | 701/117 |
| 7,130,743 B2 * | 10/2006 | Kudo et al. ................. | 701/209 |
| 7,167,795 B2 * | 1/2007 | Hirose et al. ................ | 701/210 |
| 7,512,489 B2 | 3/2009 | Endo et al. | |
| 2004/0225437 A1 * | 11/2004 | Endo et al. .................. | 701/209 |
| 2005/0010360 A1 * | 1/2005 | Nagase et al. ............... | 701/210 |
| 2005/0093720 A1 * | 5/2005 | Yamane et al. ......... | 340/995.13 |
| 2005/0206534 A1 * | 9/2005 | Yamane et al. ............. | 340/994 |

(Continued)

FOREIGN PATENT DOCUMENTS

JP          A 6-150189          5/1994

(Continued)

OTHER PUBLICATIONS

Jan. 5, 2010 Office Action issued in Japanese Patent Application No. 2004-277313.

(Continued)

*Primary Examiner*—Jack Keith
*Assistant Examiner*—Chuong P Nguyen
(74) *Attorney, Agent, or Firm*—Oliff & Berridge, PLC

(57) ABSTRACT

Systems, methods, and programs determine whether it is possible to generate statistical values based on a number of pieces of travel history information and a degree of contingency of traffic information in the travel history information. Systems, methods, and programs display, if a predicted travel time is greater than a typical travel time, at least one of a predicted travel time, a predicted arrival time, or a route in a manner that indicates that the predicted travel time is greater than the typical travel time; or display, if the predicted travel time is less than the typical travel time, at least one of the predicted travel time, a predicted arrival time, or the route in a manner that indicates that the predicted travel time is less than the typical travel time.

1 Claim, 13 Drawing Sheets

U.S. PATENT DOCUMENTS

2006/0064235 A1* 3/2006 Ishikawa et al. ............ 701/117
2006/0082472 A1* 4/2006 Adachi et al. .......... 340/995.13

FOREIGN PATENT DOCUMENTS

| JP | 8287393 | * 11/1996 |
| JP | A 08-287393 | 11/1996 |
| JP | A-11-068644 | 3/1999 |
| JP | A-11-086184 | 3/1999 |
| JP | A-2000-259983 | 9/2000 |
| JP | A-2002-318124 | 10/2002 |
| JP | A-2003-130672 | 5/2003 |
| JP | A-2004-220574 | 8/2004 |
| JP | A-2004-234649 | 8/2004 |
| JP | A 2004-239741 | 8/2004 |
| JP | 2004286565 | * 10/2004 |

OTHER PUBLICATIONS

Yan-yan Chen et al., "Model of Optimum Route Selection in Vehicle Automatic Guidance System Based on Unblocked Reliability Analysis," Journal of Beijing University of Technology, Mar. 2003, pp. 39-42, vol. 29, No. 1 (with Abstract).

Dec. 8, 2009 Office Action for Japanese Patent Application No. 2004-277655 (with English translation).

* cited by examiner

| TYPE OF ROAD | VEHICLE SPEED | CONGESTION DEGREE |
|---|---|---|
| EXPRESSWAY | ≤ 40km/h | CONGESTION |
|  | > 40km/h - 60km/h | HEAVY TRAFFIC |
|  | > 60km/h | NO CONGESTION |
| METROPOLITAN EXPRESSWAY | ≤ 20km/h | CONGESTION |
|  | > 20km/h - 40km/h | HEAVY TRAFFIC |
|  | > 40km/h | NO CONGESTION |
| GENERAL ROAD | ≤ 10km/h | CONGESTION |
|  | > 10km/h - 20km/h | HEAVY TRAFFIC |
|  | > 20km/h | NO CONGESTION |

| TRAVEL HISTORY INFORMATION (IN RANDOM ORDER) | | GENERATED STATISTICAL VALUES |
|---|---|---|
| NO CONGESTION | NO CONGESTION | NO CONGESTION |
| NO CONGESTION | HEAVY TRAFFIC | (STATISTICAL VALUE NOT GENERATED) |
| NO CONGESTION | CONGESTION | (STATISTICAL VALUE NOT GENERATED) |
| HEAVY TRAFFIC | HEAVY TRAFFIC | HEAVY TRAFFIC |
| HEAVY TRAFFIC | CONGESTION | (STATISTICAL VALUE NOT GENERATED) |
| CONGESTION | CONGESTION | CONGESTION |

FIG. 4

| TRAVEL HISTORY INFORMATION | GENERATED STATISTICAL VALUES |
|---|---|
| NO CONGESTION | NO CONGESTION |
| HEAVY TRAFFIC | (STATISTICAL VALUE NOT GENERATED) |
| CONGESTION | (STATISTICAL VALUE NOT GENERATED) |

FIG. 6

| TRAVEL HISTORY INFORMATION (IN RANDOM ORDER) | | GENERATED STATISTICAL VALUES |
|---|---|---|
| NO CONGESTION | NO CONGESTION | NO CONGESTION |
| NO CONGESTION | HEAVY TRAFFIC | (STATISTICAL VALUE NOT GENERATED) |
| NO CONGESTION | CONGESTION | (STATISTICAL VALUE NOT GENERATED) |
| HEAVY TRAFFIC | HEAVY TRAFFIC | HEAVY TRAFFIC |
| HEAVY TRAFFIC | CONGESTION | (STATISTICAL VALUE NOT GENERATED) |
| CONGESTION | CONGESTION | (STATISTICAL VALUE NOT GENERATED) |

FIG. 8

NAVIGATION SYSTEMS, METHODS, AND PROGRAMS

INCORPORATION BY REFERENCE

The disclosure of Japanese Patent Applications Nos. 2004-277313 filed on Sep. 24, 2004 and 2004-277655 filed on Sep. 24, 2004 including the specifications, drawings and abstracts are incorporated herein by reference in their entirety.

BACKGROUND

1. Related Technical Fields

Related technical fields include navigation systems.

2. Related Art

Conventional navigation systems mounted in a vehicle, for example, described in Japanese Unexamined Patent Application Publication No. H6-150189, search for a suitable route from a preset departure point to a preset destination point based on road map data. The conventional navigation systems then display the searched route. The suitable route is determined such that the distance between a departure point and a destination point is as short as possible, or the suitable route is determined such that the required travel time is as short as possible.

The conventional navigation apparatus calculates a required time to reach a destination on the basis of a distance to the destination and a vehicle speed for each preset road section. The required time may also be predicted using predicted required times for respective road sections included in traffic information. Then the display means displays the calculated predicted required time to the destination, thus providing an operator of the navigation apparatus with guidance.

SUMMARY

The aforementioned conventional systems accumulate travel history data obtained at the time of actual driving of a vehicle in a memory to determine the suitable route in consideration of the actual traffic volume or traffic congestion information.

However, in the conventional navigation apparatus, in order to determine the suitable route using the travel history data obtained at the time of actual driving of a vehicle, it is necessary to accumulate a predetermined number of pieces of travel history data. In this case, because it is necessary to accumulate the travel history data from repeatedly driving on the same road, it takes considerable time to accumulate the predetermined number of pieces of travel history data.

Even if the same road has been repeatedly traveled, the traffic volume or the traffic congestion condition may vary based on factors such as, for example, the season, the day of the week, the time, the weather, events, carnivals or festivals, traffic accidents, and traffic regulation. Therefore, in order to improve the accuracy in determining the route or calculating the estimated time of arrival, it is necessary to accumulate a predetermined number of pieces of travel history data for each road and for each factor. Therefore, it takes a long period of time until a usable volume of the travel history data is accumulated. During the accumulation period, it is not possible to effectively determine the route that achieves the shortest required time or calculate the estimated time of arrival to the destination point using the obtained travel history data.

Further, in the aforementioned conventional navigation apparatus, the operator is not informed of a result of a comparison between the length of the displayed predicted required time based on traffic information and the length of a time required in order to reach the destination in a normal traffic situation. Therefore, the operator is unable to determine whether the displayed predicted required time is longer or shorter than the normal required time. For instance, the operator is unable to determine that it will take as much time as usual because a usually crowded route to a destination is crowded as usual today as well, or that it will take more time than usual because a usually uncrowded route to a destination happens to be crowded today.

Accordingly, it is beneficial to provide a navigation system that can use generated statistical values as soon as possible.

It is further beneficial to provide a navigation system which solves the problems of the conventional navigation apparatus enabling an operator to easily recognize whether a predicted required time to a destination is longer or shorter than a usual required time and grasp a road traffic condition by changing the display mode of the predicted required time on the basis of a result of a comparison between the predicted required time and the normal required time.

Various exemplary implementations of the principles described herein provide systems, methods, and programs that obtain travel history information, accumulate the obtained of travel history information in a memory, and generate statistical values by statistically processing the accumulated travel history information. The systems, methods, and programs determine whether it is possible to generate the statistical values based on a number of pieces of the travel history information and a degree of contingency of traffic information in the travel history information.

Various exemplary implementations of the principles described herein provide systems, methods, and programs that obtain traffic information and determine, based on the obtained traffic information, a predicted travel time for a route. The systems, methods and programs obtain travel history information and determine, based on the obtained travel history information, a typical travel time for the route. The systems, methods, and programs compares the predicted travel time with the typical travel time and display, if the predicted travel time is greater than the typical travel time, at least one of the predicted travel time, a predicted arrival time, or the route in a manner that indicates that the predicted travel time is greater than the typical travel time; or displays, if the predicted travel time is less than the typical travel time, at least one of the predicted travel time, a predicted arrival time, or the route in a manner that indicates that the predicted travel time is less than the typical travel time.

BRIEF DESCRIPTION OF THE DRAWINGS

Exemplary implementations will now be described with reference to the accompanying drawings, wherein:

FIG. 4 is a table showing the relationship between the accumulated two pieces of travel history information and the generated statistical values according to an exemplary implementation of the principles described herein;

FIG. 6 is a table showing the relationship between the accumulated one piece of travel history information and the generated statistical values according to an exemplary implementation of the principles described herein;

FIG. 8 is a table showing the relationship between the accumulated two pieces of travel history information and the generated statistical values according to an exemplary implementation of the principles described herein;

DETAILED DESCRIPTION OF EXEMPLARY IMPLEMENTATIONS

Figures 2, 3:
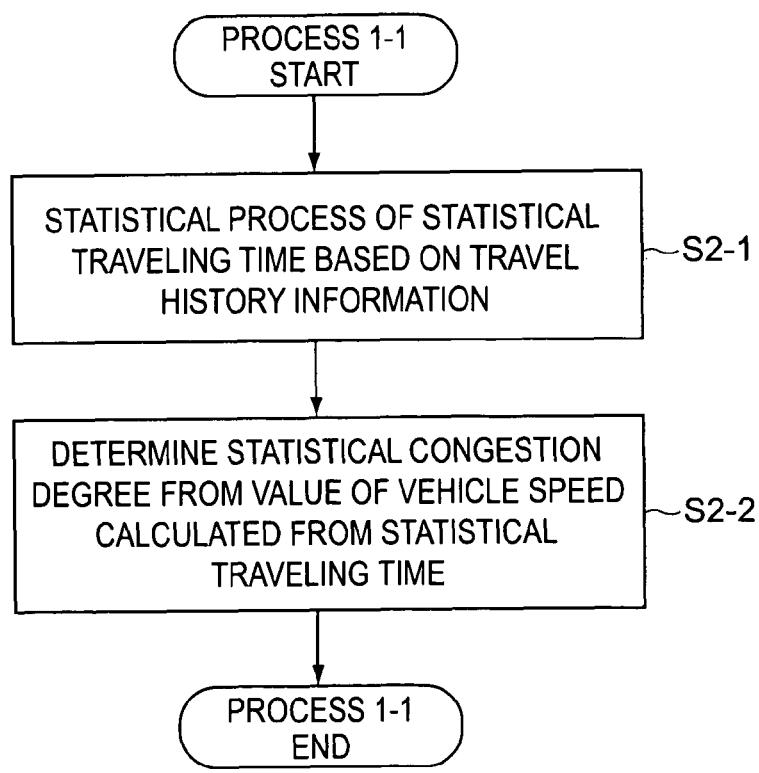
FIG. 2 is a table showing definitions of the congestion degree according to an exemplary implementation of the principles described herein.
FIG. 3 is a flowchart showing a method of determining congestion degrees according to an exemplary implementation of the principles described herein.

FIG. 2 is a table showing exemplary definitions of the congestion degree, for example, for use in a navigation system. The navigation system may be an in-vehicle device, for example, a navigation apparatus mounted in a vehicle such as a passenger car, a truck, a bus, and/or a motorcycle. The in-vehicle device has a function of searching a route from a departure point to a destination point. Any multi-function apparatus, such as, for example, a PDA (Personal Digital Assistant), and/or a personal computer may be used. Alternatively a dedicated apparatus may be used. For the purpose of this example, an in-vehicle device will be described.

Figure 14:
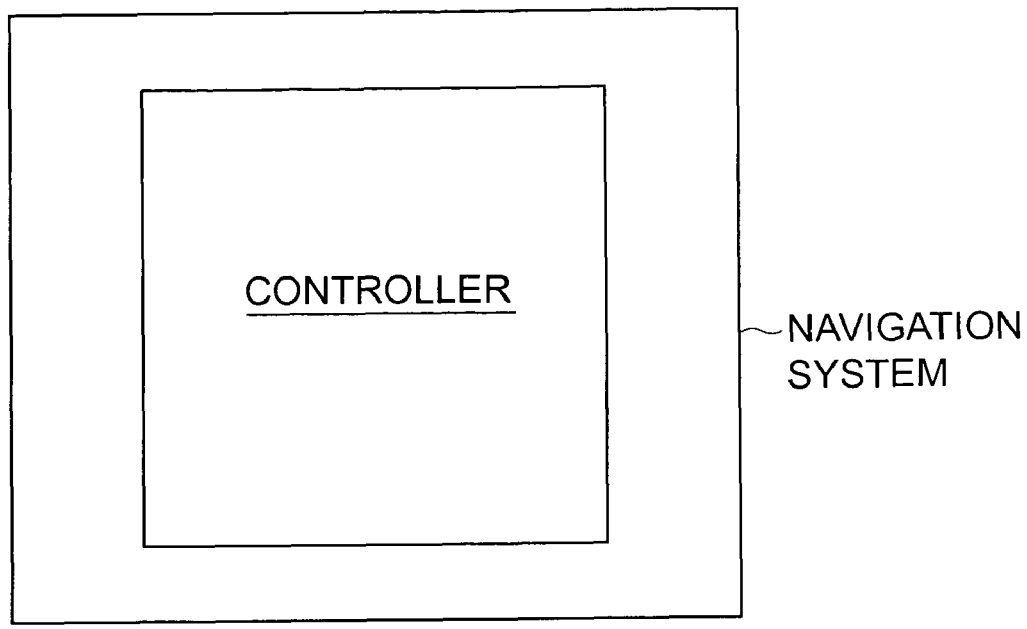
FIG. 14 shows an exemplary navigation system with a controller.

In this case, the in-vehicle device may include, for example, a controller, such as, for example a CPU or an MPU (see FIG. 14). The device may include a memory, such as, for example, a semiconductor memory, a magnetic disk, and/or an optical disk. The device may include a communication portion. The navigation apparatus may include a current position detection portion, an input portion, a display portion, a sound input portion, and/or a sound output portion. The current position detection portion, for example, detects the current position of the device using, for example, a GPS (Global Positioning System), a geomagnetic sensor, a distance sensor, a steering sensor, a beacon sensor, and/or a gyro sensor. The memory may, for example, store map data including data such as road data and search data. The controller may, for example, carry out various operating processes (navigation processes or the like) such as a route search process for searching a route to a preset destination point based on inputted information, a driving guidance process for the route, and a POI (Point of Interest) search process for searching points or facilities. The communication portion may, for example, send and receive data. In operation, the navigation apparatus may search a route to a preset destination point, and provides guidance along the searched for route.

The in-vehicle device may be used in a road traffic information communication system referred to as the VICS® (Vehicle Information & Communication System), and may receive road traffic information such as information about road traffic congestion or the like created by colleting information of the police or traffic control systems such as Japan Highway Public Corporation. The in-vehicle device may use the received information to perform a route search and to provide guidance based on, for example, information about the road traffic congestion.

The memory may include, for example, a database comprising various data files. In addition to the stored search data, the memory may record, for example, facility data for displaying a guide diagram in accordance with the searched route or other guidance information on the screen of the display portion. The memory may record information about links as units of the road. Further, the memory may record various items of data for outputting sounds of predetermined information from the sound-outputting portion.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes.

Further, the memory may include a traffic information database for storing information related to traffic information such as, for example, travel history information. The traffic information database may store link data for each of the links. For example, the required time as traveling time for each of the links, and traffic congestion degree indicating the degree of congestion for each of the links, and statistical data such as vehicle speed for each of the links are stored as link data in the memory means.

In this case, the items of the link data such as, for example, the required travel time, the congestion degree, and the vehicle speed may be stored together with link-data-change factors. For example, the link-data-change factors may include time factors, calendar factors, weather factors, and contingent factors. The time factors may include, for example, a narrow time zone (for example, a period of about 15 minutes) a wide time zone (for example, a period of about one hour), and roughly divided time zones such as, for example, "morning," "afternoon," "evening," "night," and/or "midnight." For each link, for example, the required time, the congestion degree, and/or the vehicle speed may change depending on the time zone.

Further, for example, the calendar factors may include, for example, the day of the week, the day of the month, and/or the season. For each link, for example, the required time, the congestion degree, and/or the vehicle speed may change based on the day, week, and/or season. For example, on month days with a multiple of five (5th, 10th, 15th, 20th, 25th, and 30th days of the months), during the consecutive holidays, after the consecutive holidays, during Obon holidays, at the end of the year, at the beginning of the year, during the summer vacation, the required time, the congestion degree, and the vehicle speed or the like change from usual times.

The weather factors may include, for example, "fair weather," "rainy weather," and/or "snowy weather." For each link, in the case of, for example, rainy weather or snowy weather, in comparison with the case of fair weather, the required time, the congestion degree, and/or the vehicle speed may change. Further, the contingent factors may include, for example, accidents, traffic controls, events, festivals, and/or sport competitions. For each link, in the presence of any accident, traffic regulation, event, festival, and/or sport competition, the required time, the congestion degree, and/or the vehicle speed may change.

In the in-vehicle device, the controller may, obtain the travel history information including, for example, the vehicle speed, the positional information of the vehicle detected by the current position detection processing portion, and/or information of the driving route or the like, and may store the obtained items in the traffic information database. The obtained travel history information may be associated with the link of the road on which the vehicle was driven as the data was collected. Further, the traffic information database may include a travel history information database for accumulating travel history information received from the controller.

Further, in the in-vehicle device the controller may generate statistical values, for example, by statistically processing the travel history information accumulated in the travel history information database. For example, statistical traveling time may be generated based on the link traveling time, for each of the links on which the vehicle has actually driven, included in the travel history information. Further, based on the congestion degree, statistical congestion degree may be generated based on the congestion degree included in the travel history information. The controller may generates statistical values by statistically processing the accumulated travel history information at specific times such as, for example, once a day or once a week when the vehicle is stopped. Alternatively, the controller may generate statistical values by statistically processing the travel history information obtained sequentially during driving of the vehicle.

The statistical values may be determined by excluding abnormal values. For example, at the time of generating the statistical traveling time, a link traveling time corresponding the vehicle speed of 200 km/h may excluded as an abnormal value if the remaining link traveling times are well below 100 km/h.

The controller may search for a route the route to the destination point using the statistical values such as the statistical traveling time and/or the statistical congestion degree. Thus, it is possible to search a suitable route that achieves the short required time. Further, the controller may calculate an estimated time of arrival using the generated statistical values. Thus, it is possible to calculate the estimated time of arrival with accuracy.

The controller may determine whether it is possible to generate statistical values based on the amount of data available. For example, the number of the travel history information and the degree of contingency of the traffic information may be used to generate the statistical values even if the sample number of the accumulated pieces of travel history information is a minimum sample number or less. If it is possible to generate statistical values, the travel history information may be statistically processed to generate the statistical values. According to this example, the minimum sample number is the minimum value of the sample number where it is possible to generate significant statistical values by performing a statistical process.

The relationship between the sample number and the degree of contingency of the traffic information in the case where the sample number of the travel history information is small will be explained in the following example. In the following example, the traffic information is the congestion degree.

According to this example, the congestion degree is defined as shown in a table of FIG. 2. That is, in the case of expressways such as, for example, the Tomei Expressway, when the vehicle speed is 40 km/h or less, the congestion degree is defined as "congestion," when the vehicle speed is more than 40 km/h and 60 km/h or less, the congestion degree is defined as "heavy traffic," and when the vehicle speed is more than 60 km/h, the congestion degree is defined as "no congestion." In the case of urban expressways such as Metropolitan Expressway, when the vehicle speed is 20 km/h or less, the congestion degree is defined as the "congestion," when the vehicle speed is more than 20 km/h and 40 km/h or less, the congestion degree is defined as "heavy traffic," and when the vehicle is speed is more than 40 km/h, the congestion degree is defined as "no congestion." In the case of general roads, when the vehicle speed is 10 km/h or less, the congestion degree is defined as "congestion," when the vehicle speed is more than 10 km/h and 20 km/h or less, the congestion degree is defined as "heavy traffic," and when the vehicle is speed is more than 20 km/h, the congestion degree is defined as "no congestion." Of course, the definitions of the congestion degree are not limited to the example shown in FIG. 2, and can be changed as necessary. The congestion degree table may be generated in advance, and may be stored in the memory of the in-vehicle device.

Typically, the congestion occurs sometimes in a road that is normally not congested. However, the "no congestion" condition hardly occurs in a road that is normally congested. That is, the congestion degree of "heavy traffic" or "congestion" indicates the condition of a relatively high degree of contingency, and the congestion degree of "no congestion" indicates the condition of a relatively low degree of contingency. In view of the above, according to this example, if the condition of a low degree of contingency occurs, even if the sample number of travel history information is small, the statistical values may be generated. If the condition of a high degree of contingency occurs, if the sample number of the travel history information is small, the statistical values may not be generated. Stated otherwise, in the case where the sample number of the travel history information is small, if the condition of a low degree of contingency occurs, the statistical values are generated, and if the condition of a high degree of contingency occurs, the statistical values are not generated.

Specific examples will be describe below for explanation, taking the following assumptions into account, based on the above reasoning.

(1) A link of "no congestion" is considered to be always in the condition of "no congestion." Therefore, if one piece of travel history information is accumulated, and the congestion degree is "no congestion," "no congestion" may be determined as the statistical congestion degree. The link traveling time of the travel history information is determined as the statistical traveling time.

(2) A link where "heavy traffic" occurs continuously is considered to be always in the condition of "heavy traffic." Therefore, if two pieces of travel history information are accumulated, and both of the two congestion degrees are "heavy traffic," "heavy traffic" may be determined as the statistical congestion degree, and the average value of the link traveling time of the two pieces of the travel history information is determined as the statistical traveling time.

(3) A link where "congestion" occurs is considered to have a highly variable congestion degree. Therefore, if one or two pieces of travel history information are accumulated, the statistical congestion degree and the statistical traveling time may not be generated. That is, when three or more pieces of travel history information are accumulated, the statistical congestion degree and the statistical traveling time may be generated.

(4) If many pieces of travel history information, for example, if three or more pieces of travel history information are accumulated, the statistical process is performed and, for example, the arithmetical average value and/or the median is used as the statistical value. In this case, first, the arithmetical average value and/or the median of the link traveling times in the travel history data for the link is determined as the statistical traveling time. Then, the vehicle speed is predicted based on the statistical traveling time and the link length of the link. Then, the congestion degree corresponding to the vehicle speed is determined from the table shown in FIG. 2, as the statistical congestion degree. As described above, the statistical traveling time may be calculated by excluding abnormal values.

According to this example, if three or more pieces of the travel history information are accumulated, i.e., the minimum sample number is set to three, and if the number of pieces of the travel history information is the minimum sample number or more, the statistical process is performed. This is because, it has been found that, in the case of the travel history information, it is possible to generate significant statistical values if the sample number is 3 or more. However, the minimum sample number can be set at any number. For example, the minimum sample number can be set to 4 or more.

Figure 1:
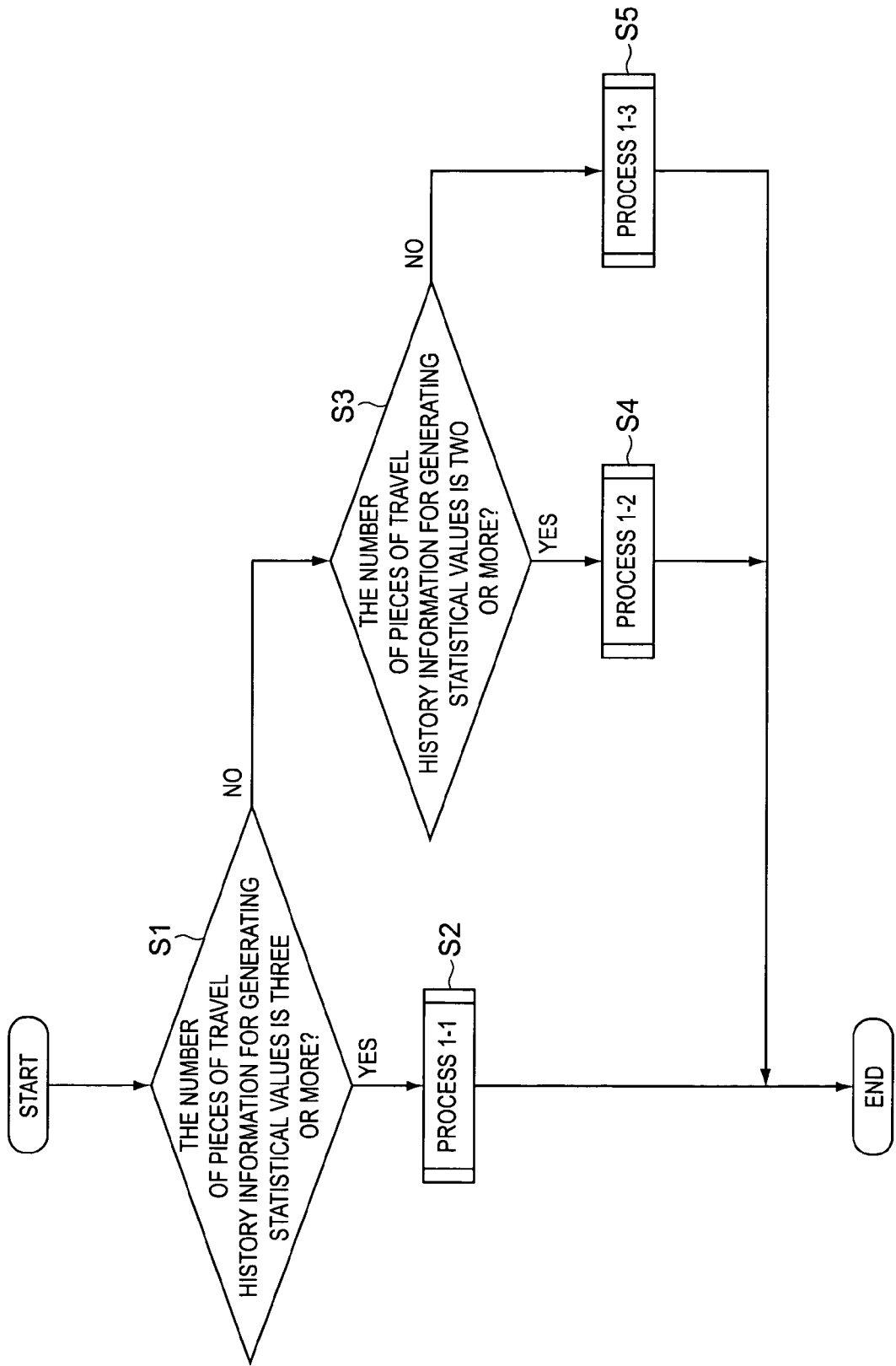
FIG. 1 is a flowchart showing a navigation method according to an exemplary implementation of the principles described herein.

Next, an exemplary navigation method will be explained, based on the above principles. In the exemplary method, for example, the in-vehicle device may generate the statistical congestion degree as a statistical value using the accumulated travel history information. FIG. 1 is a flowchart showing the exemplary navigation. The exemplary method may be implemented, for example, by one or more components of the above-described navigation device. However, it should be appreciated that the exemplary methods need not be limited by any of the above-described structure.

When travel history information is obtained by the controller, and accumulated in the travel history information database, it is determined whether the number of pieces of travel history information for generating statistical values is three or more (Step S1), for example, whether, the number of pieces of travel history information accumulated in the travel history database is three or more. If the number of pieces of travel history information is three or more (Step S1=YES), the process 1-1 is performed for generating the statistical values (Step S2), and the process is finished.

If the number of pieces of travel history information accumulated in the travel history information database is not three or more (Step S1=NO), it is determined whether the number of pieces of travel history information for generating statistical value is two (Step S3), for example, whether, the number of pieces of travel history information accumulated in the travel history database is two. If the number of pieces of travel history information accumulated in the travel history database is two (Step S3=YES), the process 1-2 is performed for generating the statistical value (Step S4), and the process is finished. If the number of the pieces of travel history information accumulated in the travel history database is not two (Step S3=N), i.e., if the number of the accumulated pieces of information accumulated in the travel history database is one, the process 1-3 for generating statistical values is performed (Step S5), and the process is finished.

Although not shown, it should be appreciated that, if the number of the accumulated pieces of information accumulated in the travel history database is zero, the method may simply end.

Next, an exemplary method for determining a statistical congestion degree based on three or more pieces of travel information will be described with reference to FIG. 3. FIG. 3 shows an exemplary method that may be performed as process 1-1 of the above-described exemplary navigation method. Again, the exemplary method may be implemented, for example, by one or more components of the above-described navigation device. However, it should be appreciated that the exemplary methods need not be limited by any of the above-described structure.

As shown in FIG. 3, the statistical traveling time is determined based on the travel history information (Step S2-1). That is, for example, the arithmetical average value and/or the median of the link traveling times in the travel history information may be determined as the statistical traveling time. At the time of calculating the statistical traveling time, abnormal values may be excluded.

Then, the statistical travel time is converted to a statistical vehicle speed and the statistical congestion degree is determined based on the statistical vehicle speed (Step S2-2). For example, the controller may calculate the vehicle speed from the statistical traveling time and the link length of the pertinent link, may determine the congestion degree corresponding to the calculated vehicle speed based on the table shown in FIG. 2 as the generated statistical congestion degree.

The statistical congestion degree and the statistical traveling time as generated may be stored in the traffic information related database, and may be used by the controller for searching a route to the preset destination point or for calculating the estimated time of arrival at the destination point. When the statistical congestion degree and the statistical traveling time of the same link have already been generated and stored in the travel history information database, the statistical congestion degree and the statistical traveling time stored in the travel history information database may be overwritten by the newly generated statistical congestion degree and the statistical traveling time.

Figure 5:
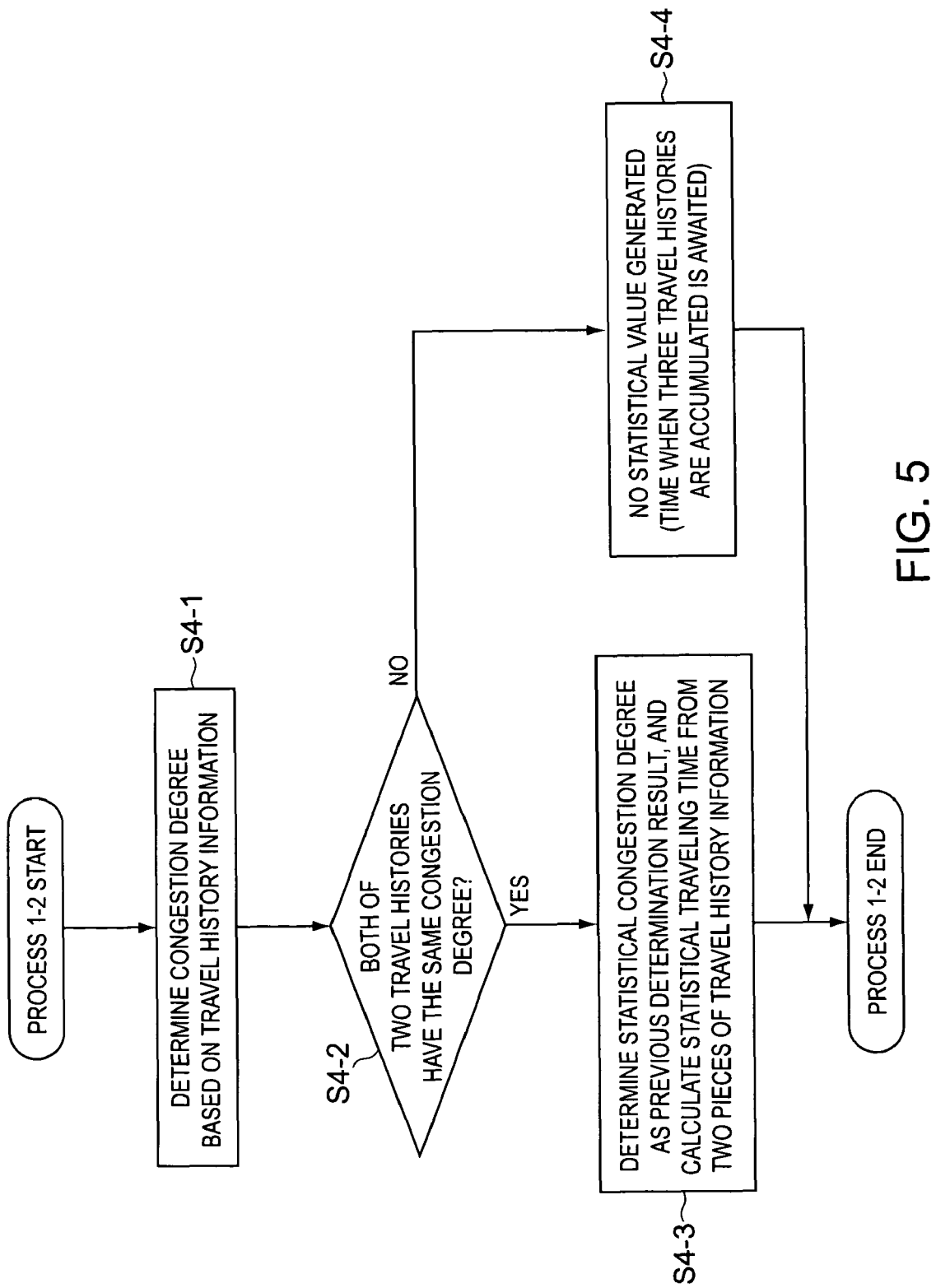
FIG. 5 is a flowchart showing a method of determining congestion degrees according to an exemplary implementation of the principles described herein.

Next, an exemplary method for determining a statistical congestion degree based on two pieces of travel information will be described with reference to FIGS. 4 and 5. FIG. 4 shows an exemplary table showing a relationship between two pieces of accumulated travel history information and the resulting generated statistical values. FIG. 5 shows an exemplary method that may be performed as process 1-2 of the above-described exemplary navigation method. Again, the exemplary method may be implemented, for example, by one or more components of the above-described navigation device. However, it should be appreciated that the exemplary methods need not be limited by any of the above-described structure.

As shown in FIG. 5, the congestion degree is determined based on the travel history information (Step S-4). For example, the congestion degree for each piece of the travel history information is determined based on the table shown in FIG. 2. Specifically, the controller may calculate the vehicle speed from the link traveling time and the link length included in each of the two pieces of travel history information, and may determine the congestion degree corresponding to the calculated vehicle speed based on the table shown in FIG. 2. Then, it is determined whether the two travel histories have the same congestion degree, (Step S4-2). Next the statistical congestion degree is determined based on a table, for example, shown in FIG. 4. Specifically, if the two travel histories have the same congestion degree (Step S4-2=YES), the generated statistical value is the same as that in the travel history (Step S4-3). If the two travel histories do not have the same congestion degree (Step S4-2=NO), the statistical value is not generated (Step S4-4).

The exemplary table shown in FIG. 4 defines whether it is possible to generate the statistical congestion degree, and if it is possible to generate the statistical congestion degree, further defines what kind of statistical congestion degree is generated. As shown in FIG. 4, if the congestion degrees of both of the respective two pieces of travel history information are "no congestion," "no congestion" is generated as the statistical congestion degree. If one of the two pieces of travel history information is "no congestion," and the other of the two pieces of travel history information is "heavy traffic," the statistical congestion degree is not generated. If one of the congestion degrees of the two pieces of travel history information is "no congestion," and the other congestion degree is "congestion," the statistical congestion degree is not generated. Further, if the congestion degrees of both of the respective two pieces of the travel history information are "heavy traffic," "heavy traffic" is generated as the statistical congestion degree. Further, if the congestion degree of one of the two pieces of travel history information is "heavy traffic," and the congestion degree of the other of travel history information is "congestion," the statistical congestion degree is not generated. Further, if the congestion degrees of both of the respective two pieces of the travel history information are "congestion," "congestion" is generated as the statistical congestion degree. The statistical congestion degree does not depend on the order when the two pieces of travel history information were obtained. The table may be generated in advance and, for example, stored in the memory.

When the congestion degrees of the respective two pieces of travel history information are the same, the controller determines the statistical congestion degree as the previous determination result, and calculates the statistical traveling time from the two pieces of travel history information. That is, the statistical congestion degree determined in accordance with the table shown in FIG. 4 is determined as the generated statistical congestion degree. The arithmetical average value and/or the median, for example, of the link traveling time of the two pieces of travel history information may be calculated as the statistical traveling time.

If the congestion degrees of two pieces of travel history information are not the same, the controller does not generate the statistical values. That is, the controller neither generates the statistical congestion degree in accordance with the table shown in FIG. 4, nor generates the statistical traveling time. Rather, the statistical congestion degree and statistical travel time are determined when three travel histories are accumulated (e.g., FIG. 3).

The generated statistical congestion degree and the statistical traveling time may be stored in the travel history information database, and may be used by the controller for searching for a route to the preset destination point or for calculating the estimated time of arrival to the destination point. When the statistical congestion degree and the statistical traveling time have already been generated for the same link and stored in the travel history information database, the statistical congestion degree and the statistical traveling time stored in the travel history information database may be overwritten by the newly generated statistical congestion degree and the statistical traveling time. If the statistical congestion degree and the statistical traveling time have not been generated, the statistical congestion degree and the statistical traveling time stored in the travel history information database may be deleted.

Figure 7:
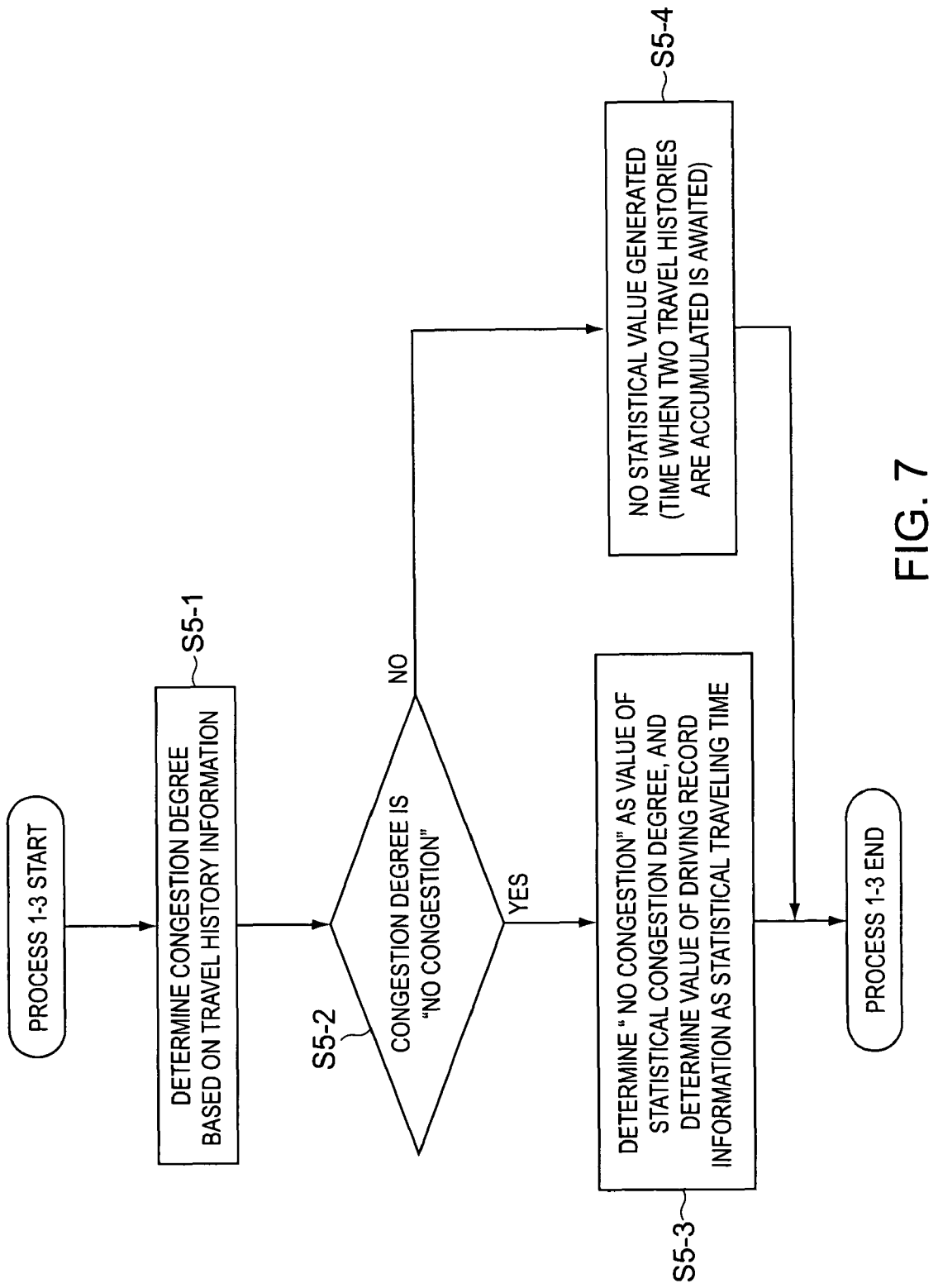
FIG. 7 is a flowchart showing a method of determining congestion degrees according to an exemplary implementation of the principles described herein.

Next, an exemplary method for determining a statistical congestion degree based on one piece of travel information will be described with reference to FIGS. 6 and 7. FIG. 6 shows an exemplary table showing a relationship between one pieces of accumulated travel history information and the resulting generated statistical values. FIG. 7 shows an exemplary method that may be performed as process 1-3 of the above-described exemplary navigation method. Again, the exemplary method may be implemented, for example, by one or more components of the above-described navigation device. However, it should be appreciated that the exemplary methods need not be limited by any of the above-described structure.

As shown in FIG. 7, the congestion degree is determined based on the travel history information (Step S5-1). For example, the controller may determine the congestion degree of each one piece of travel history information based on the table shown in FIG. 2. Then, it is determined whether the calculated congestion degree is "no congestion," (Step S5-2). Next, the statistical congestion degree may be determined based on a table, for example, shown in FIG. 6. Specifically, if the calculated congestion degree is "no congestion" (Step S5-2=YES), "no congestion" is determined as the statistical congestion degree for the link (Step S5-3). If the calculated congestion degree is not "no congestion" (Step S5-2=NO), no statistical value is generated (Step S5-4).

The exemplary table shown in FIG. 6 indicates whether it is possible to generate a statistical congestion degree based on one piece of travel history information, and if it is possible to generate the statistical congestion degree, further defines what kind of statistical congestion degree is generated. That is, if the congestion degree in the travel history information is "no congestion," "no congestion" is generated as the statistical congestion degree. Further, if the congestion degree of the travel history information is "heavy traffic," the statistical congestion degree is not generated. Further, if the congestion degree of the travel history information is "congestion," the statistical congestion degree is not generated. The table may be generated in advance, and may be stored in the memory.

Then, if the determined congestion degree is "no congestion," the controller determines "no congestion" as the statistical congestion degree, and determines the value of the travel history information as the statistical traveling time. That is, "no congestion" determined in accordance with the table in FIG. 6 is determined as the statistical congestion degree, and the link traveling time in the travel history information is determined as the statistical traveling time.

If the determined congestion degree is not "no congestion," the controller does not generate statistical values. That is, the controller neither generates the statistical congestion degree in accordance with the table shown in FIG. 6, nor generates the statistical traveling time. Then, the time when two travel histories are accumulated is awaited. That is, the controller neither generates the statistical congestion degree in accordance with the table shown in FIG. 6, nor generates the statistical traveling time. Rather, the statistical congestion degree and statistical travel time are determined when two or three travel histories are accumulated (e.g., FIGS. 3 and 5).

The generated statistical congestion degree and the statistical traveling time may be stored in the travel history information database, and may be used by the controller for searching for a route to the preset destination point or calculating the estimated time of arrival to the destination point.

In the above examples, when the sample number of the accumulated pieces of travel history information is less than the minimum sample number, based on the sample number and the degree of contingency of traffic information, it is determined whether it is possible to generate statistical values. If it is possible to generate statistical values, the statistical values are generated by statistically processing the travel history information. Thus, even if the sample number of the pieces of travel history information which have been obtained at the time of actual driving of the vehicle and accumulated is small, the statistical values generated by the statistical process of the travel history information may be used for searching the route, or for calculating the estimated time of arrival to the destination point. Therefore, after the in-vehicle device starts to obtain the travel history information, in a short period of time, it may be possible to use the statistical values generated based on the travel history information. Thus, it is possible to search the route more suitably, and calculate the estimated time of arrival more correctly.

For example, soon after purchasing the vehicle or the in-vehicle device, the sample number of the accumulated pieces of travel history information may be small. Even in this case, it is possible to search the route more suitably, and calculate the estimated time of arrival more correctly using the statistical values generated based on the travel history information. Further, the sample number of pieces of travel history information may be small for the region or the road where the user does not drive normally. However, even in the case of driving in the region or on a road of the small sample number, it is possible to search the route more suitably, and calculate the estimated time of arrival more correctly using the statistical values generated based on the travel history information.

Similarly, the sample number of pieces of travel history information may be small for the day of the week or the time zone when the user does not drive normally. However, even in the case of driving on the day or in the time zone of the small sample number, it is possible to search the route more suitably, and calculate the estimated time of arrival more accurately using the statistical values generated based on the travel history information.

It should be appreciated that although the above example has been described in the context of a navigation system that is an in-vehicle device, the navigation system may include, for example, an information providing server provided in, for example, an information center and capable of communicating with the in-vehicle device. The information provider server may send out information such as traffic information to the in-vehicle device, and may receive information such as travel histories from the in-vehicle device. Further, the operator of the in-vehicle device may be registered in the navigation system in advance, and may have a registration ID. The in-vehicle device may also be registered.

The information provider server may have a communication portion for data reception and transmission with the in-vehicle device, a memory including a travel history information database, for example, for storing the travel history information received from the in-vehicle device, and a controller. The controller may generate statistical values by statistically processing the travel history information accumulated in the travel history information database. In this case, the information provider server may statistically process the travel history information and may send the statistical values to the in-vehicle device. Thus, the in-vehicle device can search the route more suitably, and calculate the estimated time of arrival more correctly using the statistical values received from the information provider server.

The information provider server may search the route to the destination. In this case, the information provider server may search the route to the destination point using, for example, the statistical values generated by statistically processing the travel history information, and may send information such as, for example, information about the searched route and the estimated time of arrival to the destination point to the in-vehicle device. Further, the memory of the information provider server may include a traffic information database. The controller of the information provider server may access the traffic information database to obtain the required data and generate the estimated traffic information.

Next, additional examples will be explained. Components, operations, and advantages that are similar or the same as those of the above example are labeled with the same reference numeral, and explanation thereof may be omitted.

Figure 9:
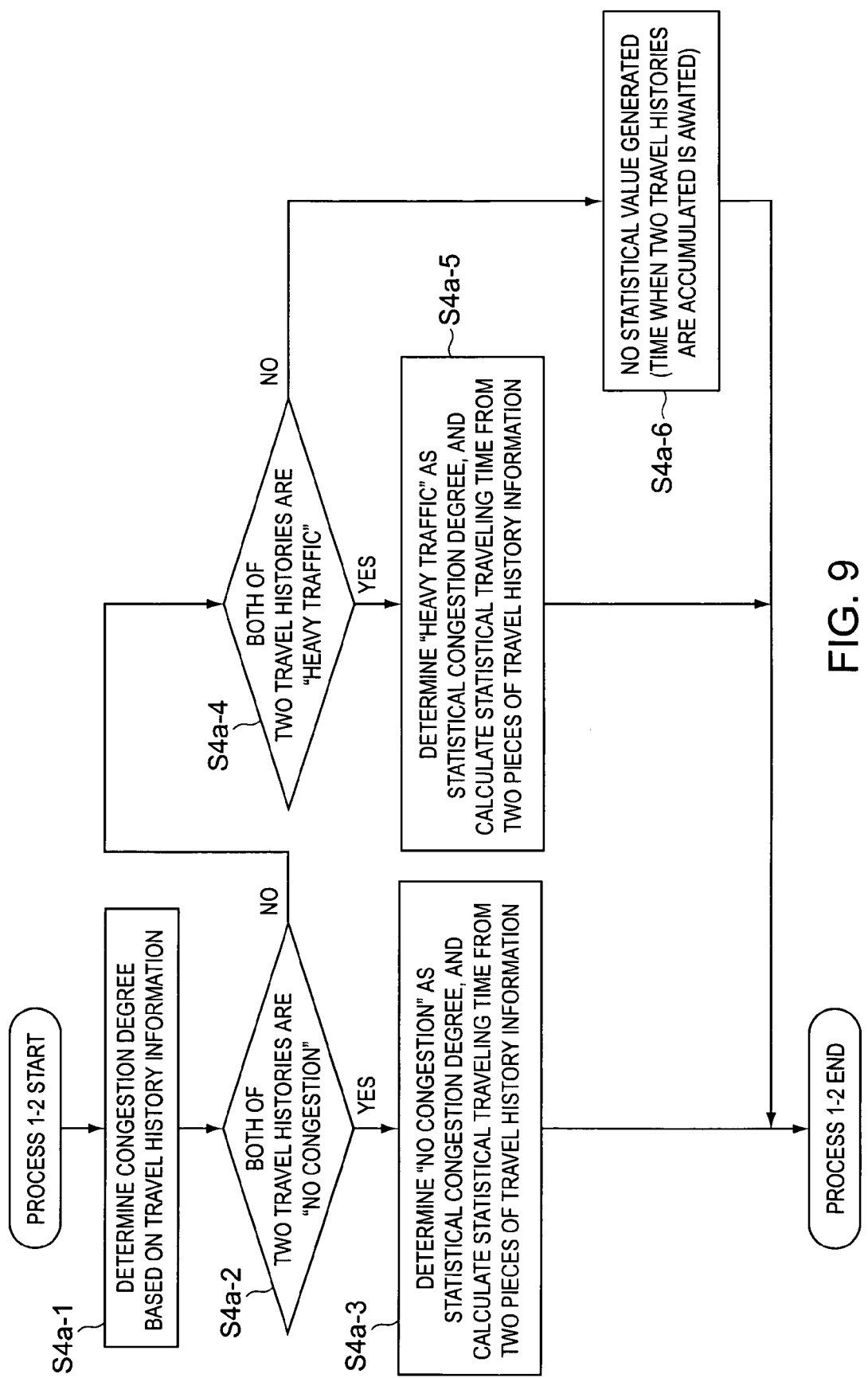
FIG. 9 is a flowchart showing a method of determining congestion degrees according to an exemplary implementation of the principles described herein.

An exemplary method for determining a statistical congestion degree based on two pieces of travel information will be described with reference to FIGS. 8 and 9. FIG. 8 shows an exemplary table showing a relationship between two pieces of accumulated travel history information and the resulting generated statistical values. FIG. 9 shows an exemplary method that may be performed as process 1-2 of the above-described exemplary navigation method. Again, the exemplary method may be implemented, for example, by one or more components of the above-described navigation device. However, it should be appreciated that the exemplary methods need not be limited by any of the above-described structure.

As shown in FIG. 9, the congestion degree is determined based on the travel history information (Step S4*a*-1). That is, the congestion degree in each of two pieces of travel history information may be determined based on a table, for example, shown in FIG. 2. For example, the controller calculates the vehicle speed based on the link traveling time and the link length included in each of the two pieces of travel history information, and ten determines the congestion degree corresponding to the calculated vehicle speed based on the table shown in FIG. 2. Then, it is determined whether both of the two travel histories have the "no congestion" congestion degree (Step S4*a*-2) or both of the two travel histories have the "heavy traffic" congestion degree (Step S4*a*-4). Next the statistical congestion degree is determined, for example, based on the table shown in FIG. 8.

Specifically, if both of the two travel histories have the "no congestion" congestion degree (Step S4*a*-2=YES), the statistical congestion degree is determined to be "no congestion." If both of the two travel histories have the "heavy traffic" congestion degree (Step S4*a*-4=YES), the statistical congestion degree is determined to be "heavy traffic." If the congestion degrees are not both "no congestion" (Step S4*a*-2=NO) or are not both "heavy traffic" (Step S4*a*-4=NO), the statistical value is not generated (Step S4*a*-6).

The table shown in FIG. 8 defines whether it is possible to generate the statistical congestion degree, and if it is possible to generate the statistical congestion degree, further defines what kind of statistical congestion degree is generated. That is, if the congestion degrees of both of the respective two pieces of travel history information are "no congestion," "no congestion" may be generated as the statistical congestion degree. If one of the two pieces of travel history information is "no congestion," and the other of the two pieces of travel history information is "heavy traffic," the statistical congestion degree may not be generated. If one of the congestion degrees of the two pieces of travel history information is "no congestion," and the other congestion degree is "congestion," the statistical congestion degree may not be generated. Further, if the congestion degrees of both of the respective two pieces of the travel history information are "heavy traffic," "heavy traffic" is generated as the statistical congestion degree. If the congestion degree of one of the two pieces of travel history information is "heavy traffic," and the congestion degree of the other of the two pieces of travel history information is "congestion," the statistical congestion degree may not be generated. If the congestion degrees of both of the respective two pieces of the travel history information are "congestion," the statistical congestion degree is not generated. The statistical congestion degree does not depend on the order when the two pieces of travel history information were obtained. Further, the table may be generated in advance, and may be stored in the memory.

Based on the table, the controller may determine whether both of the two travel histories are "no congestion," i.e., whether the congestion degrees of both of the two pieces of the travel history information are "no congestion." If the congestion degrees of both of the two pieces of travel history information are "no congestion," the controller may determine that the statistical congestion degree is "no congestion," and may calculate the statistical traveling time from the two pieces of travel history information. That is, "no congestion" determined in accordance with the table shown in FIG. 8 is determined as the generated statistical congestion degree. The arithmetical average value and/or the median, for example, of the link traveling time of the two pieces of travel history information may be calculated as the statistical traveling time.

If the congestion degrees of both of the two pieces of travel history information are not "no congestion," the controller determines whether the two records are "heavy traffic," i.e., whether the congestion degrees of both of the two pieces of travel history information are "heavy traffic." If the congestion degrees of both of the two pieces of travel history information are "heavy traffic," the controller may determine "heavy traffic" as the statistical congestion degree, and may calculate the statistical traveling time from the two pieces of travel history information.

If the congestion degrees of both of the two pieces of travel history information are not "heavy traffic," the controller may not generate any statistical values. That is, the controller neither generates the statistical congestion degree in accordance with the table shown in FIG. 8, nor generates the statistical traveling time. Rather, the statistical congestion degree and statistical travel time are determined when three travel histories are accumulated (e.g., FIG. 3).

Thus, according to this example, even in the case where the congestion degrees of the respective two pieces of the travel history information are the same, if both of the congestion degrees are "congestion," statistical values are not generated. This is because the congestion degree of "congestion" is considered to have a high degree of contingency in comparison with the congestion degree of "heavy traffic." Thus, when the sample number is the same as that of the congestion degree of "heavy traffic" having the lower degree of contingency, statistical values are not generated, and in the case where the sample number is higher, statistical values are generated. That is, the degree of contingency of the congestion degree as traffic information may be finely classified and recorded. Based on the difference in the degree of contingency, the factors for determining whether statistical values will be generated may be set finely. Therefore, it is possible to generate the statistical values more suitably.

FIG. 10 is a view showing an exemplary display screen of a navigation device.

FIG. 10 shows a display screen 11 of a display portion of a navigation device or system. The navigation system may be a navigation device mounted in a vehicle, for example, a passenger car, a truck, a bus, and/or a motorcycle. This navigation system may include any type of apparatus such as, for example, a personal computer, a personal digital assistant (PDA), a portable information terminal, a mobile phone, a personal handy-phone system (PHS), and/or game console, as long as the apparatus is equipped with a display portion. The navigation system may be composed of a single apparatus or a plurality of apparatuses. For instance, the navigation system may be composed of a navigation device and an information providing server that is communicably connected thereto, and may be adapted to perform navigation processing in response to a request transmitted from the navigation apparatus by the information providing server, transmit the results to the navigation apparatus, and cause it to display them.

Alternatively, the navigation system may be composed of a personal computer and a web server that is connected thereto via, for example, the Internet, and may be adapted to access the web server from the personal computer, acquire the results of navigation processing performed in the web server, such as route search, and cause the personal computer to display the results. In the following example, for ease of explanation, the navigation system is described as a vehicle-mounted navigation device.

In this case, the in-vehicle device may include, for example, a controller, such as, for example a CPU or an MPU. The device may include a memory, such as, for example, a semiconductor memory, a magnetic disk, and/or an optical disk. The device may include a communication portion. The navigation apparatus may include a current position detection portion, an input portion, a display portion, a sound input portion, and/or a sound output portion. The current position detection portion, for example, detects the current position of the device using, for example, a GPS (Global Positioning System), a geomagnetic sensor, a distance sensor, a steering sensor, a beacon sensor, and/or a gyro sensor. The memory may, for example, store map data including data such as road data and search data. The controller may, for example, carry out various operating processes (navigation processes or the like) such as a route search process for searching a route to a preset destination point based on inputted information, a driving guidance process for the route, and a POI (Point of Interest) search process for searching points or facilities.

The memory may stores map data including, for example, search data. That is, the memory may be provided with a database consisting of various data files, and may store various kinds of data such as facility data and the like, in addition to search data for searching for a route, in order to display a guidance map on the display screen 11 of the display portion along a found route or display other pieces of information. Information on links may also be included in the memory. Further, various kinds of data for audibly outputting predetermined pieces of information by means of the audio output portion may also be recorded in the memory.

The input portion, for example, may correct a position at the beginning of traveling or may input a destination, and may be composed of, for example, an operation key, a push button, a jog dial, and/or cross-shaped keys that are disposed on a main body of the navigation device. The input portion may also be constructed as a remote controller. In the case where the display portion is a touch panel, the input portion may be composed of operation switches such as an operation key and/or an operation menu displayed on the display screen 11 of the display portion.

For example, operation guidance, an operation menu, guidance for an operation key, a route from a current position to a destination, and/or guidance information along the route may be displayed on the display screen 11 of the display portion. The display screen 11 may include, for example, a CRT, an LCD display, a light emitting diode (LED) display, a plasma display, and/or a hologram device for projecting a hologram onto a windshield. In the following example, the display portion is described herein as a touch panel that also functions as the input portion and enables inputting by touching the operation switches such as the operation key and/or the operation menu, and the like displayed on the display screen 11 thereof.

In this example, the controller of the navigation device may search for a route from an input starting point to an input destination. The controller may acquire traffic information, for example, traffic jam information such as the position of a traffic jam section, the length of the traffic jam section, the vehicle speed in the traffic jam section, and/or the degree of congestion in the traffic jam section. The controller may create predicted traffic information on the basis of the traffic information. The controller may calculate a predicted required time, which is a predicted time required to reach the destination, on the basis of the predicted traffic information. The controller may determine, for example, through a comparison, whether the calculated predicted required time is longer or shorter than a normal required time. The controller may controls the operation of the display portion and may cause it to display a map and the predicted required time.

The controller may search for a route from a starting point to a destination. In general, a current position of the vehicle may be automatically input as the starting point. However, it is also possible for an operator to input an arbitrary spot as the starting point. The controller may then access the database stored in the memory and may search for a route in such a manner as to minimize the distance and/or required time from the starting point to the destination. Instead, however, the controller may search for a route by reference to acquired traffic information. When the route is set as a route for guidance, namely, a guidance route, route guidance may be carried out by displaying the guidance route or guidance information along the guidance route on the display screen 11 of the display portion and/or audibly outputting the guidance information from the audio output portion.

The controller may acquire present traffic information and/or past traffic information. For example, the controller may acquire traffic information including, for example, VICS® information, traffic information provided by other traffic information providing centers, and/or traffic information provided by probes such as a probe car. The traffic information may be acquired in association with VICS® links or road links. Road link ID's may be assigned to each link as identification numbers for identifying the road links.

Furthermore, the controller may create predicted traffic information used to calculate a predicted required time. The controller may create predicted traffic information on the basis of the present traffic information and/or the past traffic information.

Further, based on the predicted traffic information, the controller may calculate a predicted required time, that is, a predicted time required to reach the destination when traveling along the route. That is, the controller may calculate predicted link travel times for each link, for example, using the predicted traffic information, such as, the degrees of congestion, typical link travel times, and/or vehicle speeds, and summate the predicted link travel times, thus calculating a predicted required time. In addition, the controller may compare the predicted required time for the route with a typical required time for the route.

It should be noted herein that the typical required time may be a statistical representation of the required time to traveling along the same route in the past. The statistical representation may be, for example, an arithmetic average and/or a median. The navigation device may transmit the acquired traffic information to the memory. The memory is may be provided with a traffic information database for accumulating the acquired traffic information.

Moreover, the controller may create statistical values by subjecting the accumulated traffic information to statistical processing. For instance, the controller may creates a statistical travel time based on link travel times for the links that make up the route included in the accumulated past traffic information, and create a statistical value of the required time for traveling along the route from the starting point to the destination. The statistical value may be obtained by excluding any abnormal values before performing the statistical processing.

The pieces of information such as the link travel times and/or the vehicle may be stored together with factors that may cause changes in those pieces of information, namely, change-causing factors. The factors change-causing may include, for example, a time factor, a calendar factor, and/or a meteorological factor. The time factor may include, for example, a narrow time zone of approximately 15 minutes, a wide time zone of approximately an hour, and/or wider time zones that may be broadly classified as morning, daytime, evening, night, late night. For each link, the link, for example, the travel time and/or the vehicle speed may change depending on the time zone. The calendar factor may include, for example, the day of the week, the date, and/or the season. For each link, for example, the link travel time and/or the vehicle speed may change depending on whether the vehicle travels on a weekday or at the weekend. For example, on days ending with zero or five, during consecutive holidays, after the end of consecutive holidays, during Bon vacation, during the year-end and New Year holidays, and/or during the summer vacation, the link travel time and/or the vehicle speed may be different from usual.

Furthermore, the meteorological factor may include, for example, clear weather, rainfall, and/or snowfall. For each link, the link travel time and/or the vehicle speed, in the case of rainfall or snowfall, may be different from those in the case of clear weather. As a typical required time to be compared with, a statistical travel time corresponding to the same factor as in the case of calculating a predicted required time may be used. For instance, if the time point for calculating a predicted required time belongs to the morning time zone, the statistical travel time calculated by using the link travel times included in the traffic information acquired in the morning time zone is used.

For example, in calculating a statistical value of the link travel time for a road link A at 8:00 on Monday, link travel times for the road link A over a month in July of a certain year are acquired. In this case, on the assumption that the link travel time on July 1st (Monday) is 100 seconds, that the link travel time on July 8th (Monday) is 130 seconds, that the link travel time on July 15th (Monday) is 105 seconds, and that the link travel time on July 22nd (Monday) is 120 seconds, the arithmetic average is calculated as 114 seconds. Thus, the typical link travel time for the road link A at 8:00 on Monday can be regarded as 114 seconds.

Further, the navigation apparatus can also obtain a typical required time as a statistical value of the required time, using a traveling history that was acquired when the vehicle actually traveled along the same route in the past. In other words, the traveling history may also be included in the acquired traffic information. The controller may acquire pieces of traveling history information including a vehicle speed, information on the position of the vehicle, and/or information on traveling location, and transmits them to the memory. The pieces of traveling history information are acquired in association with the links of the roads traveled by the vehicle. The memory may be provided with a traveling history information database that accumulates traveling history information received from the controller.

The controller then creates a statistical value by subjecting the traveling history information accumulated in the traveling history information database to statistical processing. For example, the controller may create a statistical travel time as a statistical value from information included in the traveling history information, namely, the link travel times regarding the respective links actually traveled by the vehicle, and may create a statistical value of the required time for traveling along the route from the starting point to the destination. The controller may create a statistical value by subjecting the accumulated traveling history information to the statistical processing, for example, once a day, once a week, or the like when the vehicle is stopped. However, the controller may create a statistical value by subjecting pieces of traveling history information, which are sequentially acquired while the vehicle is traveling, to the statistical processing.

In this case as well, as in the aforementioned case of traffic information, it is desirable that the traveling history information such as the link travel times and the like be stored together with change-causing factors, namely, factors causing changes in the traveling history information. For instance, if the time point for calculating a predicted required time belongs to the morning time zone, a statistical travel time calculated using the link travel times included in the traveling history information acquired in the morning time zone is used.

Figure 10B:
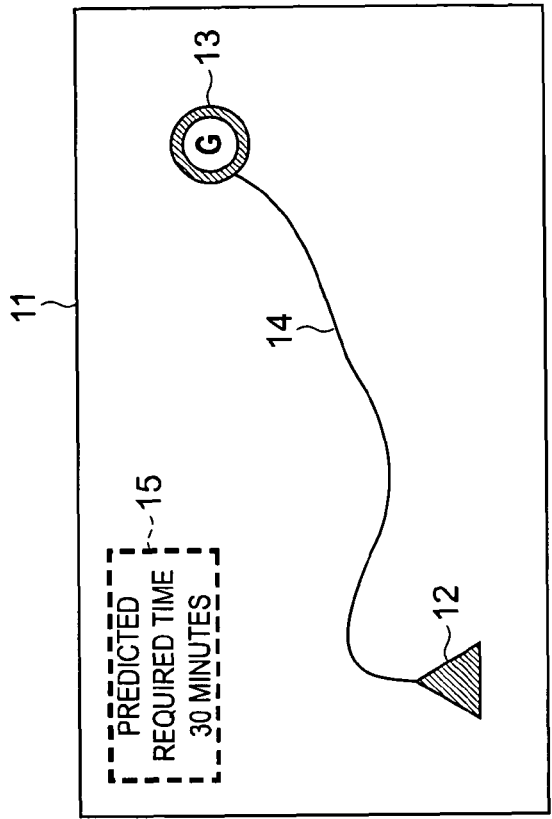
FIGS. 10A-10C show views illustrating a display screen of a navigation apparatus according to an exemplary implementation of the principles described herein.
Figure 10A:
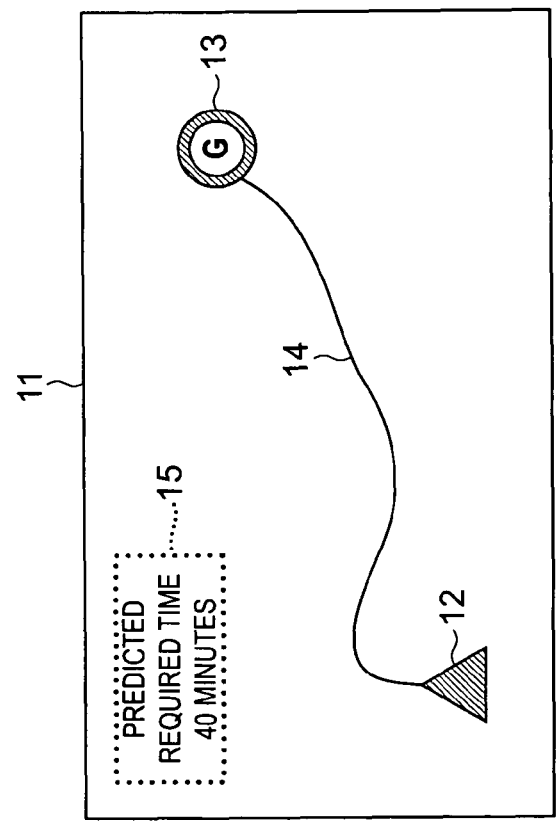

Then, as shown in FIG. 10A, the controller may cause the display screen 11 of the display portion to display the route 14 to the destination 13, and may cause the display screen 11 of the display portion to display a predicted required time display field 15 indicating the predicted required time. Referring to FIG. 10A, a current position mark 12 may indicate a current position of the vehicle on the map. The direction of an arrow on the current position mark 12 may indicates the direction of movement of the vehicle. Further, a destination mark 13 may indicate a destination set on the map and a route line 14 may indicate a route found by the controller. In the case shown in FIG. 10A, the predicted required time calculated by the controller is equal to the normal required time.

However, if the predicted required time is shorter than the normal required time, the controller may display the display screen 11 as shown in FIG. 10B. In this case, the display mode of the predicted required time display field 15 is different from the display mode thereof in the case where the predicted required time is equal to the normal required time, for example, the display mode of a frame of the predicted required time display field 15 may be changed. The display mode of the predicted required time display field 15 may be changed in any manner. The color, pattern, line thickness, line type, and/or animation of the frame of the predicted required time display field 15 may be changed. Further, the background of the predicted required time display field 15, namely, the color, pattern, and/or animation within the frame of the predicted required time display field 15 may be changed, or the font, color, and/or animation of displayed characters may be changed.

In this case, the display mode of the predicted required time display field 15 may be changed as to enable the operator to quickly recognize that the predicted required time is shorter than the typical required time. For example, the color of the frame of the predicted required time display field 15, the color within the frame, and/or the color of the characters, be changed into a color indicating, for example, safety or relief, for example, blue, green, or the like. Furthermore, the display mode of the predicted required time display field 15 may also be changed gradually in accordance with the magnitude of the difference between the predicted required time and the normal required time, that is, the amount by which the predicted required time is shorter than the normal required time. For example, the shorter the predicted required time becomes, the deeper the color of the predicted required time display field 15 can be made. The operator can thereby determine a degree of how uncrowded the route to the destination is.

Figure 10C:
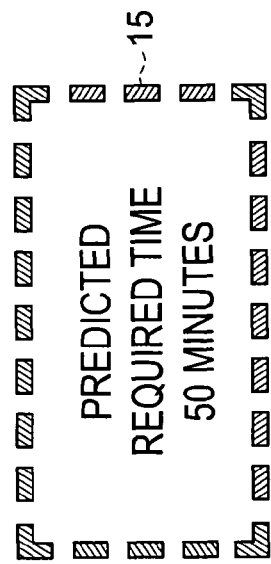

Further, if the predicted required time is longer than the normal required time, the predicted required time display field 15 may be displayed as shown in FIG. 10C. As above, the display mode of the predicted required time display field 15 may be changed in any manner, and the color, pattern, line thickness, line type, and/or animation of the frame of the predicted required time display field 15 may be changed. Alternatively, the background of the predicted required time display field 15, namely, the color, pattern, and/or animation within the frame thereof may be changed, or the font, color, and/or animation of the displayed characters may be changed. The predicted required time display field 15 in the case where the predicted required time is longer than the normal required time and the predicted required time display field 15 in the case where the predicted required time is shorter than the normal required time are displayed in different display modes and can be distinguished from each other.

In this case, it is desirable that the display mode of the predicted required time display field 15 be so changed as to enable the operator to quickly recognize that the predicted required time is longer than the normal required time. For instance, the color of the frame of the predicted required time display field 15, the color within the frame, and/or the color of the characters may be changed into a color indicating attention, danger, or the like, for example, red, orange, yellow, or the like. Furthermore, the display mode of the predicted required time display field 15 may also be changed gradually in accordance with the magnitude of the difference between the predicted required time and the typical required time, that is, the amount by which the predicted required time is longer than the typical required time. For example, the longer the predicted required time becomes, the deeper the color of the predicted required time display field 15 can be made. The operator can thereby determine the degree of how crowded the route to the destination is.

Thus, simply by visually confirming the predicted required time display field 15 displayed on the display screen 11, the operator can grasp a predicted required time to a destination and can easily recognize whether the predicted required time is longer or shorter than the normal required time. Therefore, the operator can instantaneously and accurately grasp the road traffic condition, that is, the degree of congestion of the route to the destination.

Figure 11:
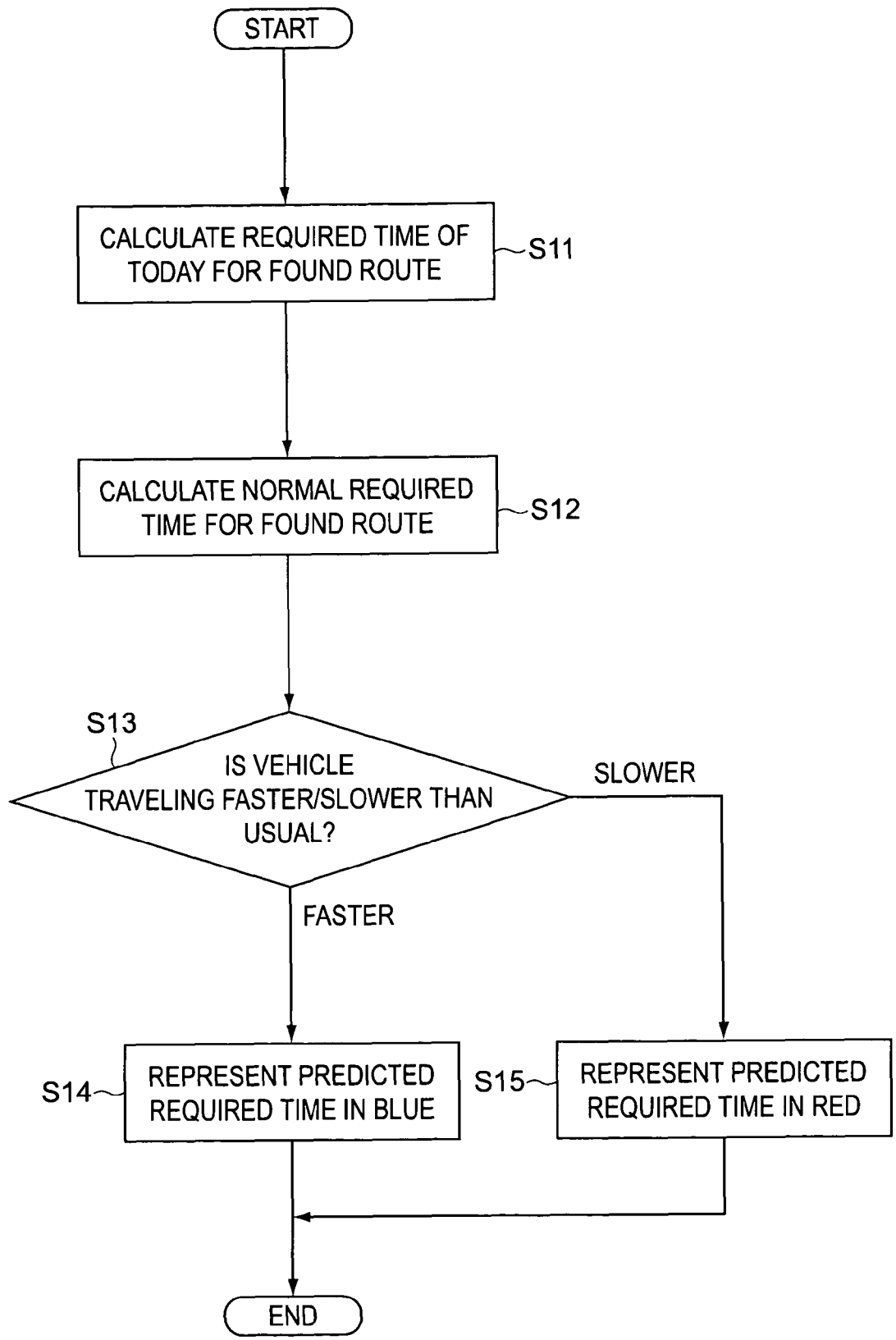
FIG. 11 is a flowchart showing the a navigation method according to an exemplary implementation of the principles described herein.

Next, an exemplary navigation method will be described with reference to FIG. 11. FIG. 11 shows an exemplary navigation method for displaying a difference in the predicted required time and the typical required time. The exemplary method may be implemented, for example, by one or more components of the above-described navigation device. However, it should be appreciated that the exemplary methods need not be limited by any of the above-described structure.

The operator may sets a destination by operating the input portion of the navigation apparatus. The operator can also set a search condition for searching for a route and the like, for instance, a preference for expressways and the like as the need arises. Subsequently, based on, for example, a current position of the vehicle, the set destination, and/or the search condition, the controller may search for a route from the current position to the destination. The controller may calculate a search cost using traffic information, and searches for such a route as minimizes the search cost.

Subsequently, as shown in FIG. 11, a predicted required time is calculated for a route found in the search (Step S11).

Then a typical required time for the found route is calculated (Step S12). For example, the controller may calculate a statistical value of the required time for reaching the destination in traveling along the found route.

Subsequently, the predicted required time is compared with the typical required time and it is determined whether the predicted required time is faster or slower than the typical required time (Step S13), i.e., whether the vehicle will be traveling along the route faster or slower than usual. In this case, it is possible to set a threshold in comparing the predicted required time with the typical required time. For example, it is possible to set a threshold such that if a difference obtained by subtracting the value of the typical required time from the value of the predicted required time is equal to or greater than a positive value of the threshold, it is determined that the predicted required time is longer than the normal required time, and if the difference is equal to or smaller than a negative value of the threshold, it is determined that the predicted required time is shorter than the normal required time. The threshold may be set to any value, such as, for example, 5% of the typical required time.

If no threshold is set, it may be determined that the predicted required time is longer than the typical required time if a difference obtained by subtracting the value of the typical required time from the value of the predicted required time is positive, and it is determined that the predicted required time is shorter than the typical required time if the difference is negative.

If the predicted required time is shorter than the typical required time (Step S13=FASTER), the predicted required time is represented in blue (Step S14). For example, the controller sets the display mode of the predicted required time display field 15 so as to enable the operator to recognize that the predicted required time is shorter than the normal required time. Therefore, the operator can instantaneously and accurately grasp that the route to the destination is in a less crowded road traffic condition than usual.

If the predicted required time is longer than the typical required time (Step S13=SLOWER), the predicted required time is represented in red (Step S15). For example, the controller sets the display mode of the predicted required time display field 15 so as to enable the operator to recognize that the predicted required time is longer than the normal required time. Therefore, the operator can instantaneously and accurately grasp that the route to the destination is in a more crowded road traffic condition than usual.

Although not shown, it should be appreciated that, if the predicted required time is equal to the normal required time, the controller sets the display mode of the predicted required time display field 15 as a normal display mode.

According to this example, as described above, the navigation device may be adapted to compare the predicted required time for reaching the destination with the normal required time and change the display mode of the predicted required time display field 15 displayed on the display screen 11 on the basis of a result of the comparison. Thus, by visually confirming the predicted required time display field 15, the operator can instantaneously and accurately grasp whether the road to the destination is more crowded than usual or less crowded than usual.

Thus, the operator can easily determine, for example, that it will not take as much time as usual because the usually crowded route to the destination is relatively uncrowded today, or that it will take more time than usual because the usually uncrowded route to the destination happens to be crowded today. Accordingly, the above navigation device may be especially advantageous when the operator travels along a daily traveled commuting route to the workplace, school, or the like or when the operator travels around his or her home, for example, in an area within a radius of 30 km or less from home.

FIGS. 12A-12D show another example of the predicted required time display field 16. In FIGS. 12A-12D, a predicted arrival time of day corresponding to a predicted required time, that is, a time of day at which the a destination will be reached is shown. In this case, the predicted arrival time may be displayed either together with the predicted required time or instead thereof. In other words, it is also possible to omit display of the predicted required time. The predicted arrival time can be easily calculated from a current time and the predicted required time, for example, calculated by the controller.

Figure 12A:
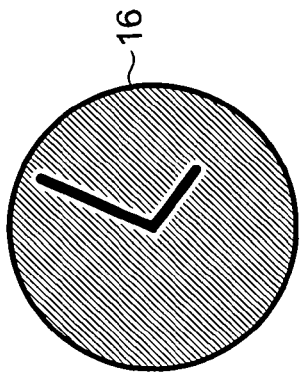
FIGS. 12A-12D are views showing an example of a predicted required time display field of a navigation apparatus according to an exemplary implementation of the principles described herein.
Figure 12B:
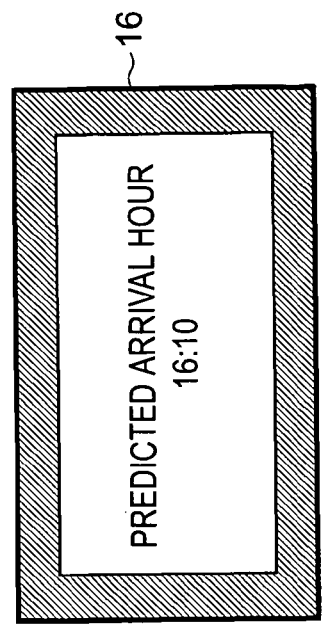

In the examples shown in FIGS. 12A and 12B, the predicted arrival time display field 16 is displayed as an analog clock. FIG. 12A shows the predicted arrival hour display field 16 in the case where the predicted required time is shorter than the typical required time, and FIG. 12B shows the predicted arrival time display field 16 in the case where the predicted required time is longer than the typical required time.

Figure 12C:
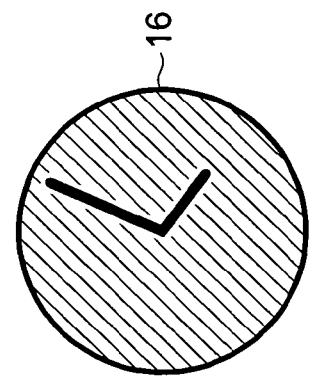
Figure 12D:
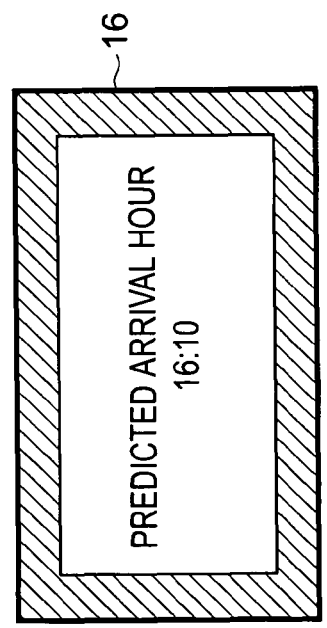

Further, in examples shown in FIGS. 12C and 12D, the predicted arrival time display field 16 is displayed in a similar manner as the predicted required time display field 15 of FIGS. 10A-10C. FIG. 12C shows the predicted arrival time display field 16 in the case where the predicted required time is shorter than the typical required time, and FIG. 12D shows the predicted arrival time display field 16 in the case where the predicted required time is longer than the typical required time.

The display mode of the predicted arrival hour display field 16 may changed in the same manner as that of the predicted required time display field 15 on the basis of a result of a comparison between the predicted required time and the typical required time. Thus, by visually confirming the predicted arrival time display field 16, the operator can instantaneously and accurately grasp whether the road to the destination is more crowded than usual or less crowded than usual.

Figure 13:
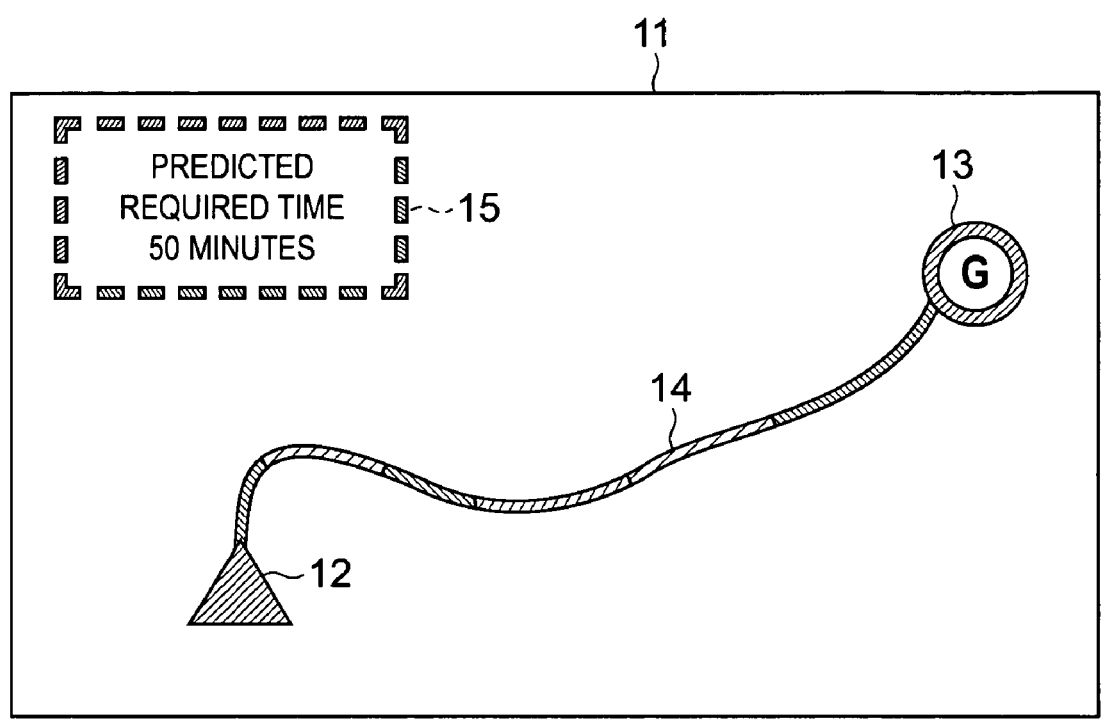
FIG. 13 shows views illustrating a display screen of a navigation apparatus according to an exemplary implementation of the principles described herein.

FIG. 13 shows another example of the display screen. In this example, the controller may changes the display mode of the route line 14 on the basis of a result of a comparison between predicted required times in respective sections of a route to a destination and corresponding typical required times in the respective sections.

The sections may be, for example, road links. However, the sections may also be multiple links. The controller may calculate predicted link travel times for each link along a route found by the controller, as predicted required times in the respective sections. Further, the controller may calculate statistical values of the link travel times for each link links as typical required travel times in the respective sections. The controller may determine, for example, through a comparison whether the predicted required times calculated for each section are longer or shorter than the typical required times for each respective section. The controller may then changes the display mode of the route line 14 as to each of the aforementioned sections, to reflect the comparison.

The display mode of the route line 14 may be changed in any manner. For example, the color, pattern, thickness, type, and/or animation a line indicating the route 14 can be changed. For instance, the display mode of the route line 14 can be changed in t similar manner as that of the predicted required time display field 15.

Thus, the display modes of respective sections of the route line 14 indicating the route to the destination may be changed on the basis of a result of a comparison between the predicted required times for each section of the route and the corresponding typical required times for the respective section. Therefore, by visually confirming the route line 14, the operator can grasp whether the road to the destination is more crowded than usual or less crowded than usual, as to each of the sections.

As discussed above, predicted traffic information may be created on the basis of present traffic information, and a predicted required time may be calculated on the basis of the predicted traffic information. However, the statistical value of the traffic information may also be stored together with an event factor. For example, event information, for example, pieces of information on fireworks exhibitions, marathon races, festivals, intensive repair works for expressways, and the like may acquired from administrative institutions, police departments, road administrators such as Japan Road Traffic Information Center and the like, event companies, and publishing companies, and predicted traffic information may be created utilizing the statistical values of the traffic information on event factors corresponding to those pieces of event information, instead of using the present traffic information. A predicted required time may be calculated utilizing the predicted traffic information created. Then, a typical required time may be calculated utilizing the statistical values of day-of-the-week and time-zone factors corresponding to the current date and the current hour respectively. The typical required time may also be calculated in consideration of season and month factors.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A navigation system, comprising:
a controller configured to:
obtain travel history information for each link of a plurality of links when a vehicle is actually driven;
accumulate the obtained travel history information for the each link of the plurality of links in a memory;
determine whether it is possible to generate a statistical value for one link of the plurality of links by statistically processing the accumulated travel history information for the one link based on a number of pieces of the accumulated travel history information for the one link and a degree of contingency of traffic information of each piece of the accumulated travel history information for the one link, the degree of contingency of traffic information being congestion degree information;
calculate the congestion degree information of the each piece of the accumulated travel history information for the one link; and
generate, when the number of pieces of the accumulated travel history information for the one link is less than a minimum sample number and all of the pieces of the accumulated travel history information for the one link have same congestion degree information, the same congestion degree information as the statistical value for the one link, wherein,
each statistical value comprises a statistical congestion degree and a statistical traveling time;
the congestion degree information indicates at least one of no congestion, heavy traffic, and congestion; and
when the number of pieces of the accumulated travel history information for the one link is three or more, the controller is configured to generate the statistical congestion degree and the statistical traveling time;
when the number of pieces of the accumulated travel history information for the one link is two and all of the pieces of the accumulated travel history information for the one link have the same congestion degree information, the controller is configured to generate the statistical congestion degree and the statistical traveling time; and
when the number of pieces of the accumulated travel history information for the one link is one and the congestion degree information of the accumulated travel history information for the one link indicates no congestion, the controller is configured to generate the statistical congestion degree and the statistical traveling time.

* * * * *